United States Patent [19]

Scott et al.

[11] Patent Number: 4,522,860
[45] Date of Patent: Jun. 11, 1985

[54] MATERIAL FOR REINFORCING CORE IN A STRUCTURE

[75] Inventors: John T. Scott, Hornings Mills; Charles King, Mississauga, both of Canada

[73] Assignee: Metalcore Limited, Etobicoke, Canada

[21] Appl. No.: 456,914

[22] Filed: Jan. 10, 1983

[51] Int. Cl.³ .............................................. B32B 3/30
[52] U.S. Cl. ...................................... 428/132; 29/6.1; 52/671; 52/673; 52/674; 428/137; 428/174; 428/597
[58] Field of Search ............... 428/131, 132, 156, 174, 428/593, 595–597, 186, 137; 52/635, 671, 673, 674, 794, 795, 816; 29/6.1

[56] References Cited

U.S. PATENT DOCUMENTS

| 993,851 | 5/1911 | Loucks . | |
|---|---|---|---|
| 2,052,213 | 8/1936 | Branstrator . | |
| 2,434,232 | 1/1948 | Singleton . | |
| 3,376,684 | 4/1968 | Cole et al. | 52/635 |
| 3,388,805 | 6/1968 | Lovett | 428/596 |
| 3,591,351 | 7/1971 | Ullman | 29/6.1 |
| 3,825,465 | 7/1974 | Stock | 52/671 |
| 3,869,778 | 3/1975 | Yancey | 428/596 |

FOREIGN PATENT DOCUMENTS 600063  1/1926  France .................................. 52/816

Primary Examiner—Paul J. Thibodeau
Attorney, Agent, or Firm—Hirons, Rogers & Scott

[57] ABSTRACT

A material for use as a core in panels or structural members includes a longitudinal and transverse axis which lie in a common plane. The material includes alternating first and second strips that are interconnected at spaced intervals along the longitudinal axis by lands lying in the common plane. Each of the first strips is formed to have portions lying to one side of the common plane and each of the second strips has portions lying to the other side of the common plane. The interconnected lands define webs extending along the transverse axis to provide inherent stiffness to the material.

15 Claims, 13 Drawing Figures

MATERIAL FOR REINFORCING CORE IN A STRUCTURE

The present invention relates to material suitable for use as a reinforcing core in a structure and to a method of making such material.

The use of cores between facing panels in a structural member is well known. Such construction provides the necessary rigidity for the structural member whilst at the same time providing economies of weight and manufacture. The materials used to provide such cores range from solid plywood through to strips of paper arranged in a honeycomb fashion between facing panels.

The exact form of the structural member will depend to a large extent on its end use with common applications currently available being the use of a plywood sheet between a pair of fibre glass skins for use in trailer bodies, the use of balsa wood between a pair of fibre glass skins for boat construction and the use of a paper honeycomb between particle board panels for office partions and the like.

Various attempts have been made to utilise sheet metal for core material due to the availability of sheet metal and the relatively low cost and high strength that it provides. However none of the previous proposals have satisfactorily provided a reinforcing material that provides the required rigidity for handling during manufacture, the versatility to enable the material to be formed in various shapes and cut to various sizes and an economical manner of manufacturing. The majority of prior proposals have taken a sheet of metal of the appropriate thickness and slit it prior to forming the sheet into the required configuration. This has resulted in a relatively expensive material due to the separate conversion operations of slitting and forming and has also resulted in waste material. Moreover the configuration of the material after slitting required complicated forming techniques tnat have again increased the cost of manufacture.

U.S. Pat. No. 3,869,778 to Yancey shows a prior attempt to provide a sheet of reinforcing material from a sheet of metal in which ribbons or strips of material are twisted in opposite directions to form a generally honeycomb cross section. With this arrangement however pre-slitting of the material is required and the deformation of the resultant strips causes localised twisting of the material between the oppositely inclined webs. This also results in a reduction in both the width and the length of the sheet material during forming that makes the manufacture of the material exceedingly difficult. The material shown in Yancey also does not have any great rigidity in its finished form so that handling of the material in subsequent lamination operations becomes difficult.

It is therefore an object of the present invention to provide a material and a method of making such a material in which the above disadvantages are obviated or mitigated.

According therefore to the present invention there is provided a sheet of material having a longitudinal axis and a transverse axis lying in a common plane, said material comprising alternating first and second strips extending along one of said axes and interconnected at spaced intervals along said one axis by lands lying in said common plane, each of said first strips being formed to lie to one side of said common plane and each of said second strips being formed to lie to the other side of said common plane.

According also to the present invention there is provided a sheet of material having a longitudinal axis and a transverse axis lying in a common plane, said material comprising strips extending along one of said axis and interconnected at spaced locations along said axis by lands, lying in said common plane, said lands being aligned to provide webs of material extending transverse to said one axis with portions of said strips between said lands being displaced from said common plane, said webs having sufficient dimension along said one axis to permit severance of said sheet along said web whilst maintaining connection between adjacent strips.

According also to the present invention there is provided a method of making a sheet of material from a web having a longitudinal and transverse axis lying in a common plane, said method including the steps of forming a plurality alternating first and second strips in said material with said strips being interconnected at spaced intervals by lands, displacing each portion of said first strips between said lands to one side of said common plane and displacing each portion of said second strips between said lands to the opposite side of said common plane.

Embodiments of the invention will now be described by way of example only with reference to the accompanying drawings in which, FIG. 1 is a perspective view of the first embodiment of a portion of a sheet of material suitable for use as a core in a laminated structural member, FIG. 2 is a view on the line 2—2 of FIG. 1, FIG. 3 is an enlarged view of a portion of the sheet shown in FIG. 1 illustrating the interconnection between adjacent portions of the sheet, FIG. 4 is a side view of the sheet of material shown in FIG. 1 with a portion of the sheet displaced through 90°.

FIG. 5 is an end view of a lamination formed from the sheet of material shown in FIG. 1 with the sheet folded through 90° to form a corner of a structural member, FIG. 6 is a perspective view similar to FIG. 1 showing the manner in which the sheets of FIG. 1 may be stacked on top of one another, FIG. 7 is a sectional view of a lamination formed from a further embodiment of material having different dimensions to that shown in FIG. 1, FIG. 8 is a view on the line 8—8 of FIG. 7.

Figure 1:
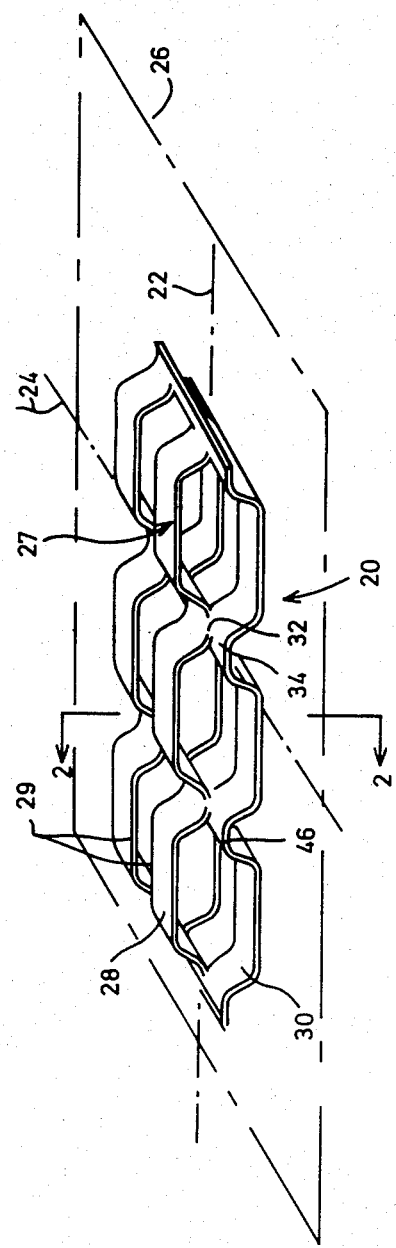

Referring now to FIG. 1, a sheet of material 20 for use as a reinforcing core includes a longitudinal axis 22 and a transverse axis 24 that lie in a common median plane indicated by the chain dotted lines 26. The sheet 20 is formed from a plurality of first and second strips 28-30 that alternate across the width of the sheet 20 and each have longitudinal edges 29. Opposed edges 29 merge at lands 32 to interconnect the strips. The lands 32 lie in the median plane 26 and are aligned on axes generally parallel to the transverse axis 24.

Each of the strips 28,30 is formed from a plurality of identical segments 27 that are connected at opposite ends by a node 34 formed by the portion of the strip between the lands 32.

Each of the segments 27 includes a pair of oppositely inclined serpentine portions 36, each formed from a concave and convex curve 38–40. Between the serpentine portions 36 is a planar portion 42 that lies generally parallel to but displaced from the median plane 26.

Each of the first strips 28 is arranged so that the planar portions 42 are displaced to one side of the median plane 26 and the second strips disposed so that their planar portions 42 are displaced to the opposite side of the median plane 26. Thus each segment 27 of the respective strips 28,30 are simply repeated along the length of the strip to define the sheet of material 20.

Figure 3:
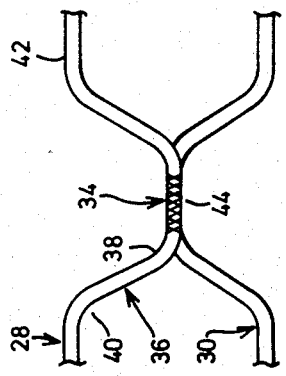
Figure 6:
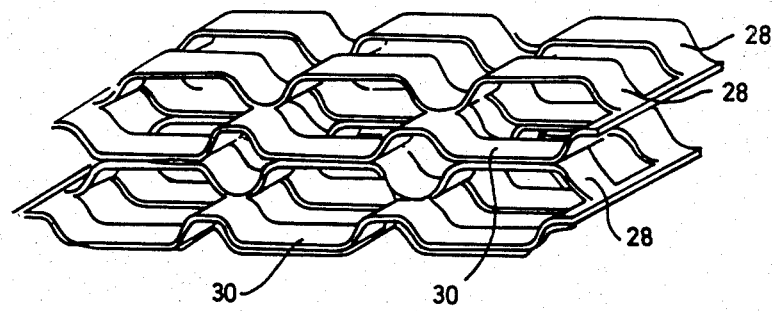

As can best be seen in FIG. 3, each of the nodes 34 includes the generally flat zone 44 between the two serpentine portions 36 so that the land 32 between adjacent strips is of generally rectangular cross section as indicated by the double hatched lines in FIG. 3. The zones 44 and lands 32 combine to provide a number of transversely extending webs generally indicated 46, lying in the median plane and extending parallel to the transverse axis 24 at spaced intervals along the longitudinal axis. The webs 46 provide a degree of rigidity to the sheet 20 to facilitate its handling. The webs 46 are effectively continuous strips of material lying in the median plane and so the inherent stiffness of those webs provides the required rigidity. At the same time the finite length of the lands 32 provided by the flat zone 44 in each node 34 enables the material 20 to be cropped in the direction of the transverse axis whilst still retaining a connection between the adjacent first and second strips 28–30.

Figure 4:
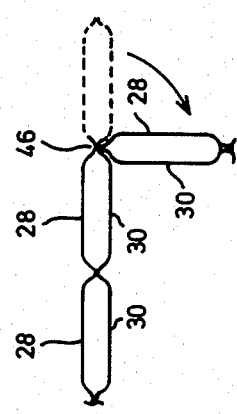
Figure 5:
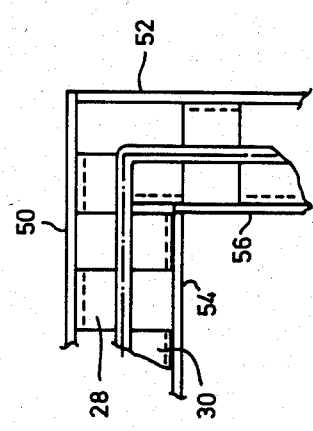
Figure 2:
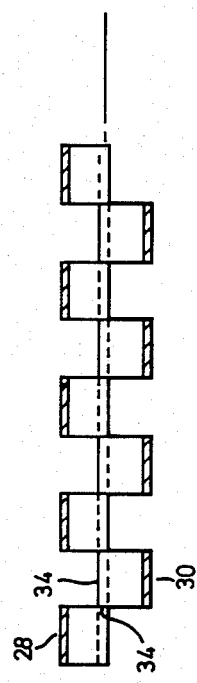

The sheet 20 shown in FIGS. 1 through 3 can be manipulated to a number of different configurations as shown in FIGS. 4 and 5. In FIG. 4 the sheet 20 has been folded through 90° along the line extending along one of the webs 46. The configuration of the serpentine portions 36 is such as to enable the adjacent planar portions to be accommodated in the interior of the corner formed by the fold without interference. At the same time the planar portions of the exterior of the corner present surfaces disposed at 90° to facilitate the attachment of panels for the formation of laminated structural members.

The dimensions of the segments 37 are chosen so that the spacing between the outwardly directed surfaces of the planar portions when measured in a direction normal to the median plane 26 is 0.375 inches and the width of each strip is 0.25 inches. The mean spacing between lands 32 is 1 inch with the length of each planar portion being 0.5 inches. The flat zone 44 has a length of 0.125.

The provision of the lands 32 in the median plane 26 also enables the sheet 20 to be folded about a line parallel to the longitudinal axis 22. This configuration is shown in FIG. 5 where it will be seen that the alternation of the first and second strips and the disposition of respective planar portion 42 to opposite sides of the median plane 26 allows the planar portions 42 on the interior of the corner adjacent the fold line to be accommodated without interfering with the planar portion 42 of the strip on the opposite side of the fold line. In FIG. 5 a right angle corner is formed in a lamination by attaching exterior panels 50–52 to the surfaces presented by the planar portions 42 of the first strips 28 and by attaching interior panels 54–56 to the surfaces presented by the planar portions of the second strips 30. Such attachment may be achieved by suitable adhesives or lamination material, mechanical fasteners or spot welding depending on the nature of the panels 50–56.

Figure 7:
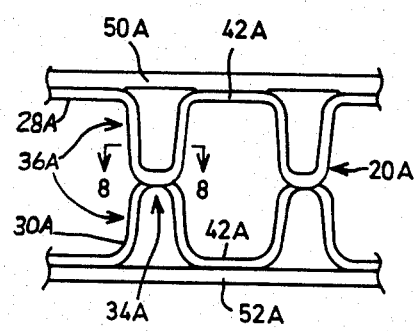
Figure 8:
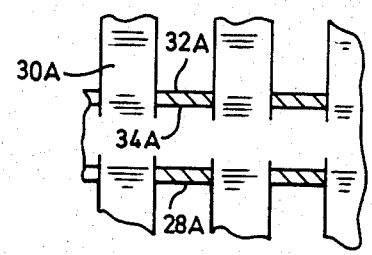

An alternative configuration of material is shown in FIG. 7 where the spacing of the planar portions from the median axis is increased. In the embodiment of FIG. 7 like reference numerals will be used to denote the similar components to that shown in FIGS. 1 through 5 which a suffix A added for clarity of discription. In the embodiment shown in FIGS. 7 and 8 the spacing between the planar portions 42A measured in a direction normal to the median plane 26A is increased to the order of three quarters of an inch so that material 20A is interchangable with the commonly used plywood core. In this embodiment the serpentine portion 36A is elongated to provide the necessary spacing between the planar portions 42A. As shown in FIG. 7, the outwardly facing surface of the planar portions 42A provides attachment surfaces for panels 50A–52A to provide a laminated structure suitable for use as a structural member.

In the embodiment of FIG. 7 the width of the first and second strips is 0.1875 inches whereas the spacing of each planar portion from the median plane 26A is 0.375 inches so that the folding illustrated in FIG. 4 is prohibited. Similarly the length of the flat zone 44A is less than the height of the planar portions 42A so that the abrupt folding shown in FIG. 5 is not possible. However this facility can be retained if the width of the strips is increased to be greater than the displacement from the median plane 26A of the planar portion 42A or if the flat zone 44A in the node 34A is increased by a corresponding amount. The material 20A of FIG. 7 is nevertheless capable of being curved about either axis as shown in FIGS. 9 and 10.

Figure 9:
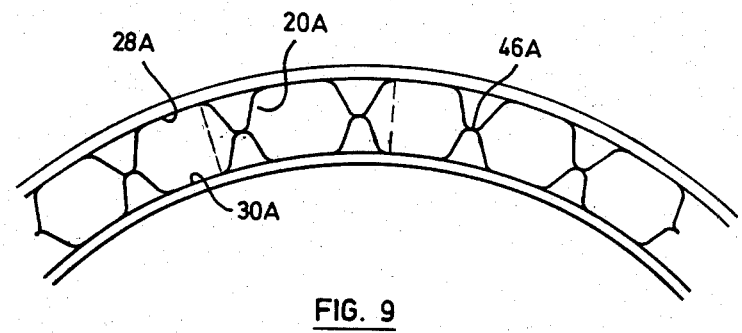
FIG. 9 is a section through a curved lamination utilising the material shown in FIG. 7.
Figure 10:
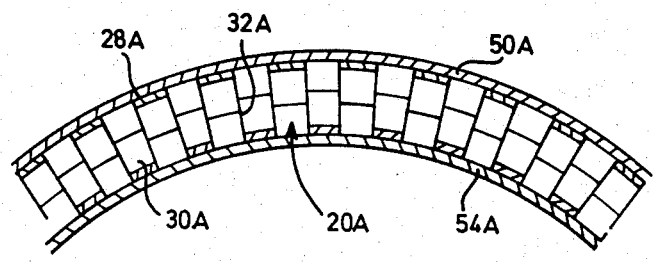
FIG. 10 is a section through a lamination with the sheet of FIG. 7 curved about an axis perpendicular to the axis of curvature shown in FIG. 9.

In the embodiment of FIG. 9 the sheet 20A is curved about an axis generally parallel to the transverse axis 24A so that the radially inner planar portions 42A are brought closer together with the radially outer planar portions being moved further apart. The curving of the sheet 20A is provided by flexing of the webs 46A about the transverse axis so that each segment of the strips 28A–30A adopts a chordal position to approximate to a constant radius curve. The metal sheet 20A may be held in that position by lamination with exterior panels 50A and interior panels 54A to provide a curved structural member.

Similarly the first and second strips 28A–30A may be rotated relative to one another by flexing the land 32A between adjacent strips. In this case the sheet 20A may be curved about an axis lying parallel to the longitudinal axis as shown in FIG. 10 and laminated with exterior and interior panels 50A–54A respectively.

Figure 13:
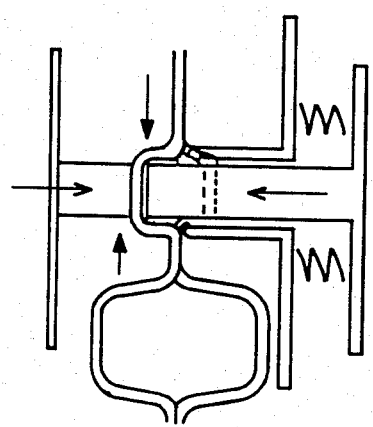
FIG. 13 is a view similar to that of FIG. 11 showing the die in a partially closed configuration.
Figure 11:
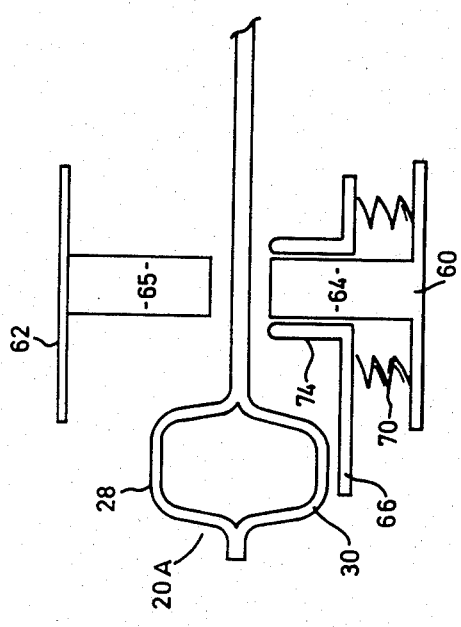
FIG. 11 is a sectional view of a die used to form the sheet shown in FIG. 7.
Figure 12:
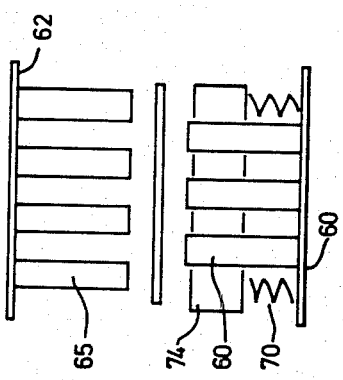
FIG. 12 is a section on the line 12—12 of FIG. 11.

The sheet of the two embodiments shown above may be formed with a simple die as shown in FIGS. 11, 12 and 13. The die includes a pair of plattens 60–62 on each of which is mounted a set of upstanding teeth 64, 65. The teeth 64, 65 are shaped to the configuration of each of the segments and the sets are staggered relative to one another along transverse axis so that upon closing the die the teeth 64, 65 interdigitate. The number of teeth provided corresponds to the number of strips of material from which the sheet 20A is formed and the total width of the die may be up to four feet. Similarly the thickness of each tooth and the spacing between adjacent teeth of each set is chosen to correspond to the width of each of the strips 28-30.

A stripper plate 66 is mounted on the platten 62 with a pair of springs 70 acting between the platten 62 and the stripper plate. The plate 68 carries a pair of upstanding fingers 74 disposed on either side of the teeth 64 and extending the width of the die. The upper edge of the fingers conforms to the shape of the radiused portion 36, portion 38 and the height of the finger corresponds to the offset of the planar portion 42 from the medial plane 26.

To form the sheet 20 from a web of material, the web is placed between the two sets of teeth 64, 65 of the open die. The die is then closed by the press and the teeth 64, 65 moving in an opposite direction shear the web and form the segments 37 corresponding to the shape of the teeth. During the forming process the web is pulled into the die from either side to provide sufficient material to form the segment 37 around the tooth without stretching the material.

The die is then opened and the stripper plate forces the formed segment 37 from the teeth 64, 65. The web is then advanced and the die closed to form the next segment 37. The advancement of the web is regulated by the desired width of the flat zone 44 and the extra material required to form the segment as the die closes. The web is therefore indexed beyond the spacing between adjacent serpentine portions and as the die closes the previously formed segment is drawn back towards the die as indicated by the arrows in FIG. 13. Because the die is performing a simple shearing operation on the material it is not necessary to pre-slit the material. Moreover there is no decrease in the width of the strip being converted although there is of course the corresponding decrease in the length of the material. The equal and opposite displacement of adjacent segments ensures that the forming action is balanced and facilitates the separation of adjacent strips in a single operation. Moreover because all of the segments of one strip are displaced to the same side of the median plane a simple die can be used where one set of segments is formed at a time. This can be compared with the previous proposals where the segments were disposed to opposite sides of the median plane where the die would be required to form the number of segments in each operation. The ability to form only a single segment at a time by means of a simple die also facilitates the drawing of material into the die so that undue stretching and work hardening of the material does not occur. Moreover the spacing between adjacent segments can be changed simply by varying the amount of material indexed to provide different configurations of the metal sheet.

Comparisons have been made between the material shown in the embodiments of FIGS. 7 through 10 when used to form the panel material of a trailer body. The conventional material used for such application is a laminate formed from a core of three quarter inch Douglas fir ply having glass fibre sheets on the exterior surfaces. This arrangement has a weight of 2.26 lbs per square foot whereas a corresponding material formed from the sheet 20 of 30 gauge material with the fibre glass coatings provided a weight of 0.5 lbs per square foot. This obviously significantly contributes to the lightness of the trailer and hence increases the payload that can be carried by the trailer.

In compression testing of a laminated sample using a core as shown in FIG. 1 having an overall thickness of 0.401 inches, a width of 2.470 inches, a length of 2.665 inches to provide a total area of 6.582 inches, the following results were obtained.

| Yield Load | | Ultimate Load | | Deflection |
|---|---|---|---|---|
| (lb) | (psi) | (lb) | (psi) | (in.) |
| 936 | 142 | — | — | 0/048" |
| — | — | 2,775 | 421 | 0.228" |

Similarly on a load deflection test on a three point loading fixture a test piece of the same thickness but having a width of 1 inch and a length of 2.5 inches when loaded with a mandrel of ⅛ inch diameter provided the following results.

| Max. Load (lb) | Defl. (in) | Load @ Skin Separation. | Defl. (in) |
|---|---|---|---|
| 107 | 0.061 | 95 | 1.170 |
| 95 | 0.054 | 95 | 0.117 |

The metal sheet shown above may be used in a number of different environments. It may be used to replace conventional panels such as used on trailers, transit vehicles or cargo containers. It may also be used in structural panels for desks and office partitions and may be extended to mobile and prefab homes. It is also conceivable that the core may be used to replace conventional flooring walls and roofs in buildings.

The sheet may also be used with concrete reinforcements provided of course the spacing between the nodes and the thickness of the strips is adjusted to provide adequate penetration of the aggregate into the sheet.

Various metals have been used to form the material 20 including aluminum, low carbon steel galvanised steel in either 20-30 gauge. It is anticipated that other gauges and materials may be used, for example, stainless steel to suit the particular appliction. The use of higher quality drawing steels is not required due to the simple forming operation involved in the manufacture.

The embodiments of the invention in which an exclusive property or privilege is claimed are defined as follows:

1. A sheet of material having a longitudinal axis and a transverse axis lying in a common plane, said material comprising alternating first and second strips extending along one of said axes and interconnected at spaced intervals along said one axis by lands lying in said common plane, each strip including portions between adjacent lands displaced from said common plane with all such portions of each of said first strips being formed to lie to one side of said common plane and all such portions of each of said second strips being formed to lie to the other side of said common plane.

2. A sheet of material according to claim 1 wherein said portions of each of said strips between said lands lie parallel to and spaced from said common plane.

3. A sheet of material according to claim 2 wherein said lands on opposite edges of said strips are aligned on axis lying parallel to the other of said axes.

4. A sheet of material according to claim 1 wherein all of said portions on one of said strips project to one side of said common plane and all of the portions on the adjacent strip project to the opposite side of said common plane.

5. A method of making a sheet of material from a web having a longitudinal and transverse axis lying in a common plane, said method including the steps of forming a plurality alternating first and second strips in said material with said strips being interconnected at spaced intervals by lands, displacing each portion of said first strips between said lands to one side of said common plane and displacing each portion of said second strips between said lands to the opposite side of said common plane.

6. A sheet of material according to claim 2 wherein opposite ends of each of said portions are connected to respective lands by arcuate members.

7. A sheet of material according to claim 2 wherein said portions between said lands are generally planar and each is equidistant from said common axis.

8. A sheet of material according to claim 3 wherein said lands define webs lying in said common plane and extending between opposed edges of said sheet.

9. A sheet of material according to claim 1 wherein said material is formed from metal.

10. A method according to claim 5 including the step of displacing adjacent portions of said first and second strips simultaneously to opposite sides of said common plane.

11. A method according to claim 10 wherein said material is sheared between adjacent portions upon displacement thereof to opposite sides of said common plane.

12. A method according to claim 10 wherein successive ones of said portions of each strip are displaced by successive operations.

13. A laminate comprising two sheets of facing material spaced apart to provide a pair of opposed inwardly directed surfaces and a core member disposed between said sheets and interconnecting said inwardly directed surfaces, said core member comprising alternating first and second strips extending along a first axis and interconnected at spaced intervals along said first axis by lands, each strip including portions between adjacent lands displaced to one side of said lands with all such portions of said first strips being displaced toward one of said inwardly directed surfaces and all such portions of said second strip being displaced toward the other of said inwardly directed surfaces.

14. A laminate according to claim 13 wherein each of said portions has a generally planar outwardly directed surface and said inwardly directed surfaces of said facing sheets are attached to respective ones of said outwardly directed surfaces to provide a unitary construction.

15. A laminate according to claim 14 wherein said core material is formed from metal.

* * * * *